No. 636,477. Patented Nov. 7, 1899.
E. E. WHIPPLE, Dec'd.
H. M. WHIPPLE, Administratrix.
SUPPORTING ATTACHMENT FOR AGRICULTURAL IMPLEMENTS.
(Application filed Dec. 16, 1898.)
(No Model.)
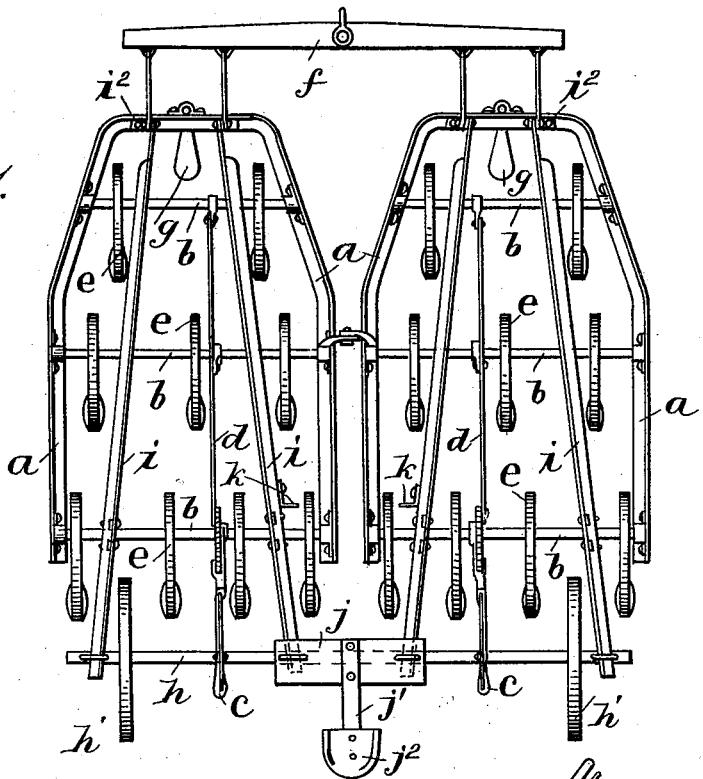
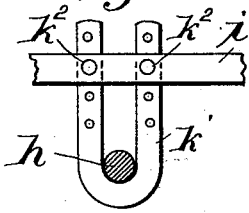
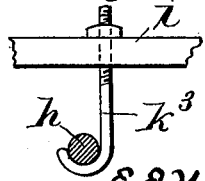

UNITED STATES PATENT OFFICE.

HANNAH M. WHIPPLE, OF DETROIT, MICHIGAN, ADMINISTRATRIX OF EFFINGER E. WHIPPLE, DECEASED.

SUPPORTING ATTACHMENT FOR AGRICULTURAL IMPLEMENTS.

SPECIFICATION forming part of Letters Patent No. 636,477, dated November 7, 1899.

Application filed December 16, 1898. Serial No. 699,490. (No model.)

*To all whom it may concern:*

Be it known that EFFINGER E. WHIPPLE, deceased, late a citizen of the United States, and then residing at St. Johns, in the State of Michigan, did invent certain new and useful Improvements in Supporting Attachments for Agricultural Implements, and that I, HANNAH M. WHIPPLE, of Detroit, Michigan, special administratrix of the estate of said E. E. WHIPPLE, deceased, do hereby declare the following to be a full, clear, and exact description of the invention, such as will enable others skilled in the art to which it appertains to make and use the same.

The invention relates to certain improvements in harrows, and more particularly to wheeled supporting or riding attachments for harrows or other agricultural implements; and the objects and nature of the invention will be apparent from the following description.

The invention consists in certain novel features in construction and in combinations of parts, as more fully and particularly pointed out and described hereinafter.

Referring to the accompanying drawings, Figure 1 is a plan view of a two-section spring-tooth lever-harrow with the supporting attachment applied thereto. Fig. 2 is a side elevation. Fig. 3 is a detail side elevation. Fig. 4 is a detail side elevation of a modification.

In the drawings a two-section harrow is shown. The sections are usually similar in construction, although not necessarily so, and they can be either entirely independent and separately coupled at the front to an evener-bar or the two sections can be united at their inner or adjacent sides or edges by hinges.

$a$ is the rigid frame of a harrow-section, herein shown formed with a front cross bar or piece. The frame extends rearwardly in the line of draft and carries suitable journal boxes or bearings, in which the transverse tooth-bars $b$ turn and by which they are coupled to the rigid frame-bars. The usual lever mechanism, comprising hand-lever $c$ and connecting-bar $d$, is provided to rock the tooth-bars of a section to raise and lower the teeth thereof simultaneously and lock them in the desired adjustment.

The tooth-bars are shown carrying curved spring harrow-teeth $e$, properly clamped or secured thereto and suitably spaced.

This invention is not confined to curved-spring-tooth harrows, but is as well adapted as an attachment for spike or other tooth agricultural implements, the construction of the harrow *per se* not being involved herein.

$f$ is a front evener-bar, to which the harrow-sections are coupled and to which the draft-animals are hitched through the medium of suitable devices or connections.

The term "harrow-frame" employed hereinafter generally covers the entire framework, comprising the rigid frame or frame-bars as well as the tooth-bars connected thereto.

If desired, each harrow-section can be provided with front frame-supports, such as shoes or wheels; but it is not always necessary to employ such, although I here show front depending shoes $g$ to hold the front of the frame from the ground.

The wheeled support comprises a wheeled supporting-frame arranged over the harrow and loosely coupled thereto at the front to move forward therewith and having depending supports receiving loosely a rear part of a harrow-section frame and permitting limited vertical play of the harrow independently and yet limiting downward movement of the harrow and upholding the same at a predetermined horizontal plane.

In the specific example shown in the drawings of a supporting attachment within the scope of this invention, $h$ is an axle arranged transversely in rear of the harrow and preferably in rear of each section thereof and across the plane of the space between the harrow-sections. Usually, although not necessarily, the axle is in length equal to the full width of the harrow. The axle is provided with supporting-wheels $h'$, turning loosely thereon. Of course the number of wheels employed and the exact location thereof on the axle are immaterial, so far as the scope of this invention is concerned, although the drawings show two supporting-wheels arranged a distance inwardly from the ends of the axle, respectively, and extending or arranged between teeth on the rear tooth-bars of the harrow.

$i$ are beams at their rear ends rigidly secured to the axle and from thence extending forwardly and at their front ends coupled at the front of the harrow to move the attachment forward with the harrow. This invention is not limited to the number of such beams employed nor to the arrangement thereof, although the drawings show two such beams extending over each harrow-section, as other arrangements of supporting-frames could be provided within the spirit of this invention to sustain each harrow-section against lateral tilting or at each side portion thereof.

The drawings show each beam as approximately straight and horizontal and extending forwardly between the upward curves of the teeth and a short distance above the harrow-frame or such a distance as will permit the free limited independent vertical play of the harrow. The front end of each beam is extended downwardly (see $i'$) and coupled to the front bar of the rigid frame of the harrow. The coupling is preferably formed by perforated ears $i^2$ from the harrow-frame, between which said bent end $i'$ extends, and a bolt $i^3$ is passed through the parts, thereby forming a joint, which permits vertical swing of the rear ends of the harrow and the attachment. The end or nose $i'$ is preferably formed with a vertical series of bolt-holes, so that the removable bolt $i^3$ can be placed in various holes, and hence the vertical position of the beams $i$ can be varied with respect to the harrow.

In the example shown in the drawings two beams are provided for each harrow-section, and the beams are arranged, respectively, near opposite sides of each section. The outer beam is shown clipped to the outer end of the axle, and the two beams are shown converging toward the front of the harrow, although it is obvious that they need not be secured thereto at separated points, as shown. The two inner beams are clipped to the central portion of the axle, and a block or plate $j$ is rigidly secured thereon. The seat-support $j'$, carrying seat $j^2$, is secured to this block, and hence is arranged about centrally of the axle with the seat in rear thereof. The said two inner beams or bars $i$ are shown provided with foot-rests $k\,k$. At an intermediate point each beam or bar $i$ is provided with a vertically-elongated guideway and support. Various devices can be employed for this purpose, although in the drawings each beam is shown provided with a U-shaped strap or hanger $k'$. The said support can be bent from strap or bar iron, with the lower closed end and the legs passing upwardly through openings in the beam, so that the support can be vertically adjusted therein. Each leg of the support is usually formed with a vertical series of bolt-holes, and bolts $k^2$ are passed transversely through the beams and the said legs of the support. The bolts are removable, so that the supports can be raised or lowered, although they are normally fixed to the beams $i$. These supports extend beneath a rear part or parts of the harrow and limit the downward movement thereof below a certain horizontal plane and yet permit free vertical play of the harrow above said plane to the plane where the harrow engages the beams $i$. The amount of play usually allowed is sufficient at least to permit raising and forcing down the teeth without raising and lowering the wheeled attachment with the harrow-frame. However, the range of independent movement allowed the harrow can be raised beyond such limits.

The supports preferably extend beneath a tooth-bar of each harrow-section, near opposite ends thereof, respectively, so as to hold the section against tilting during transportation and to hold the same level or horizontal when working. Usually the supports coact with the rear tooth-bar, although the same can extend beneath other parts of the harrow-frame.

Other forms of supports or guides can be employed, such as a single leg or shank, with a lower stop or laterally-bent end or hook-shaped device. The harrow is guided and confined in its vertical play by such guiding-supports, and when the teeth are elevated the supports uphold the rear portions of the harrow-sections from the ground for transportation.

When the teeth are down, the tooth-bars settle down on the supports when the teeth are working their full depth in the soil, and hence limit the working depth thereof, although the harrow can rise and fall above the plane of the supports in said guideways and independently of the wheeled attachment.

Of course the attachment can be employed with a harrow composed of one or more sections and with or without a seat, and the supporting or draft frame between the axle and front part of the harrow can be formed otherwise than by beams $i$, and other forms of supports can be employed whether or not such form guideways.

If desired, the supports can be so adjusted upwardly of the attachment as to practically prevent vertical play of the harrow independently of the wheeled attachment—that is, the supports can be so adjusted as to leave practically no space for effective play of the rear tooth-bars or harrow-frame and the supporting-bars of the attachment independently of each other. It should also be noted that the bars of the attachment limit the upward play of the harrow, if so desired, it being usually preferred that a slight independent play only be allowed between the rear of the harrow and the attachment. Whether or not the support is confined or coupled to the rear part of the harrow it is preferred that the support be independent of the harrow so far as the position of the teeth is concerned—that is, the support is preferred to be entirely independent of the rotation or rocking of the tooth-bars, which are free to turn independently of and without by that movement raising or elevating the harrow on the support. The support is preferably arranged to limit the independent vertical play of the rear of the harrow between the lower end of the support and the bar of the attachment—that is, the rear of the harrow-frame is limited or upheld by the support from dropping below a certain predetermined horizontal plane, which remains the same whatever the position of the teeth, whether raised or lowered. For instance, in the specific example illustrated the harrow-frame is supported in an approximately horizontal position, although the invention is not so limited, the rear tooth-bars turning freely in the U-shaped supports, and when the teeth are raised that movement does not forcibly elevate the rear end of the harrow and tilt the same forwardly onto the front shoes.

The harrow in the construction illustrated swings vertically from its front end, and while a sufficient play of the rear of the harrow is allowed independent of the supporting attachment to permit raising and forcing down the teeth, yet it is preferred that the attachment hold the teeth down to work when necessary and permit the harrow to maintain its approximately horizontal position whether the teeth are in or out of the soil, and in the example shown the objectionable features of causing the harrow to rock vertically on a middle tooth-bar as a center and of providing the rear tooth-bar with rigid crank-arms connected with a riding-sulky to forcibly elevate and force up the rear end only of the harrow when the teeth are raised and thereby tilting the harrow forwardly are avoided.

It is obvious that various changes might be made in the forms, constructions, and arrangements of the parts described without departing from the spirit and scope of this invention. Hence it is not desired to limit the invention to the exact constructions disclosed.

Having fully described the invention, what is claimed as new, and desired to be secured by Letters Patent of the United States, is—

1. A wheeled supporting attachment for harrows and the like comprising a wheeled axle and beams secured thereto and extending forwardly therefrom and provided with depending front attaching ends with vertical series of bolt-holes for coupling to the front end of the harrow, and at intermediate points with depending vertical supports, substantially as described.

2. A wheeled supporting attachment for harrows and the like comprising a wheeled axle carrying a seat and provided with a forwardly-extending approximately horizontal draft and supporting frame having depending supporting-guides fixed thereto, substantially as described.

3. A wheeled supporting attachment for harrows and the like comprising a rear wheeled axle provided with a rigid forwardly-extending draft-frame provided with vertically-elongated supporting-guideways fixed thereto, and means rendering said guideways adjustable vertically of said frame, substantially as described.

4. A wheeled supporting attachment for harrows and the like comprising the wheeled axle having an approximately horizontal frame fixed thereto, provided with a series of depending U-shaped supports closed at their lower ends and at their upper ends fixed to said frame, substantially as described.

5. A turnable tooth-bar harrow, in combination with a wheeled axle, draft-beams secured thereto and extending forwardly and at their front ends connected at the front of the harrow, and supports secured to said beams and extending into loose disconnected engagement with opposite portions of the rear part of the harrow independent of the position of the tooth-bars and forming a certain predetermined limit for the downward movement of the harrow-frame, substantially as described.

6. A harrow, in combination with a wheeled supporting attachment comprising a wheeled axle, horizontally-disposed bars carried thereby and extending over the harrow and coupled thereto at the front, and supporting-guides from said bars and loosely receiving parts of the harrow and permitting limited independent vertical play of the rear end of the harrow between the supports and said bars, substantially as described.

7. A harrow, in combination with a rear wheeled axle provided with horizontally-disposed bars secured to the axle and extending forwardly close over the harrow and forming stops limiting the independent upward movement of the rear of the same, and at their front ends hinged at the front of the harrow, said bars provided with depending stops upholding the rear end of the harrow above a fixed plane, substantially as described.

8. A several-section lever-adjustment harrow, in combination with a wheeled axle arranged transversely of the sections and a draft and supporting frame secured to the axle and over the harrow and coupled loosely to the front ends of the section-frames so that the rear of the harrow can swing vertically from said couplings, and provided with depending vertically-elongated guides at opposite sides of each section having supports beneath each section-frame, substantially as described.

9. A harrow having a rigid front frame cross bar or piece in combination with a rear wheeled axle and beams secured to said axle and extending forwardly over the harrow and at their front ends hinged to said front cross bar or piece to permit independent vertical play of the rear of the harrow, said beams provided with supports upholding the rear portion of the harrow, substantially as described.

10. A harrow, in combination with a wheeled riding attachment coupled thereto and moving forward therewith and provided with vertically-adjustable U-shaped hangers loosely receiving a part of the harrow-frame, substantially as described.

11. A harrow, in combination with a wheeled supporting attachment coupled thereto and provided with depending U-shaped hangers loosely receiving a tooth-bar of the harrow, substantially as described.

12. A turnable tooth-bar harrow, in combination with a wheeled supporting attachment comprising the axle provided with bars secured thereto and extending forwardly over the harrow and having depending front ends, pivot-bolts coupling said ends to the front of the harrow-frame, a depending ground-support secured to the front end of said frame so that the harrow can swing vertically from its front end, said bars provided with depending supports for the rear of the harrow, substantially as described.

13. A harrow, in combination with the wheeled supporting attachment provided with bars secured thereto and extending forwardly over the harrow and coupled to the harrow, said bars in advance of the axle having depending guides rigid therewith and provided with stops beneath the harrow, substantially as described.

14. A two-section harrow having ground-supports, and a supporting attachment comprising a wheeled axle, draft and supporting bars extending over opposite sides of the harrow-sections, respectively, and secured to the axle and at their front ends hinged to the front ends of the section-frames, each bar provided with a support loosely embracing a tooth-bar, substantially as described.

15. A harrow, in combination with a wheeled axle having bars at their rear ends secured thereto and extending forwardly of the harrow and loosely coupled directly to the rigid front end of the harrow-frame, said bars having supports for the harrow, substantially as described.

16. A two-section harrow, in combination with a wheeled axle arranged transversely of both sections, bars rigidly secured to said axle and extending forwardly over the harrow and at their front portions coupled therewith, each section having bars on opposite sides of the longitudinal center thereof, and depending guides rigid with said bars and embracing rear portions of the sections, substantially as described.

17. A harrow, in combination with a wheeled supporting attachment coupled to move forward with the harrow and provided with depending guides rigid therewith and receiving and limiting the downward movement of a tooth-bar, substantially as described.

18. A riding attachment comprising the wheeled axle, connecting-bars at their rear portions secured to the axle and extending forwardly therefrom and at their front ends provided with means for coupling to the harrow, certain of said bars secured at the end portions and certain at the intermediate central portion of the axle, the seat carried by and arranged about at the central portion of the axle, and the foot-rests rigid on the intermediate bars, substantially as described.

19. A two-section turnable-tooth-bar harrow, each section having a rigid front frame-bar, in combination with the supporting attachment comprising an axle and bars secured to said axle and extending forwardly of the harrow, the bars arranged over the opposite sides of each section, converging forwardly and at their front ends hinged to the central portion of said front end of the section-frame, said harrow having front supports and said bars provided with supports for the rear of the section-frames, substantially as described.

20. A harrow, having turnable tooth-bars and front supports, in combination with a wheeled axle provided with bars secured thereto and extending forwardly of the harrow, vertically-adjustable coupling means between the front ends of said bars and the harrow confining the bars to the harrow in vertical adjustment, whereby the bars can be leveled with respect to the harrow, said bars having depending supports loosely confined to the rear of the harrow, substantially as described.

21. A harrow, in combination with a wheeled support having forwardly-extending bars coupled to its axle, said bars forming stops limiting the independent upward movement of the rear of the harrow, supports from said bars limiting the downward drop of the rear of the harrow, and adjustable securing means between said supports and said bars whereby the supports can be adjusted vertically of the bars to vary or prevent the independent play between the rear of the harrow and the bars, substantially as described.

22. A harrow, in combination with a rear wheeled axle, bars secured to the end portions of the axle and extending forwardly over the harrow, bars secured to intermediate portions of the axle and extending forwardly over the harrow, the front ends of said bars loosely coupled to the harrow, a plate or block secured over the axle and on said intermediate bars, a seat-support secured on said block and carrying a seat, and supports upholding the front and rear ends of the harrow, substantially as described.

23. A harrow, in combination with a wheeled supporting attachment coupled to move forward with the harrow, depending fixed supports or hangers extending beneath parts of the harrow, and adjustable securing means fixedly locking said hangers to said attachment and permitting vertical adjustment thereof with respect to the attachment, substantially as described.

24. A two-section harrow, each section having the rigid front cross-frame end, the front evener-bar coupled with said rigid front-frame ends, each front-frame end having a depending ground-support coupled therewith, in combination with a supporting attachment comprising a draft and supporting frame having supporting-wheels and at the front pivotally joined to said rigid front cross ends of the section-frames, said draft-frame having supports upholding the rear portions of the section-frames, substantially as described.

25. A harrow, in combination with a wheeled supporting attachment coupled therewith and provided with rigid depending inclosing guides forming supports beneath parts of the harrow-frame held against vertical movement independently of said frame, said supports upholding the rear portion of the harrow-frame in a certain predetermined plane, substantially as described.

26. A harrow having ground-supports, in combination with a wheeled axle carrying a rider's seat and having horizontally-disposed bars secured thereto and at their front ends loosely coupled with the front of the harrow, said bars extending over and close to the harrow-frame forming stops holding the rear portion of the frame down, and supports for the rear of the harrow limiting the downward drop thereof below said bars, substantially as described.

27. A harrow having perforated parts rigid with its front end, in combination with a wheeled axle having forwardly-extending bars provided with supports for the rear portion of the harrow, and horizontal coupling pivot-bolts between the front ends of said bars and said perforated parts rigid with the front end of the harrow, substantially as described.

28. A several-section harrow having ground-supports, in combination with an attachment comprising a horizontally-disposed draft and supporting frame extending over the harrow from rear to front and provided with a wheeled support and at its front hinged to the front ends of the harrow-frames, and fixed depending supports from said draft-frame to the rear portions of the harrow-sections establishing a certain predetermined limit of downward movement of the harrow-frames independently of and without forcibly lifting the rear ends of the harrow-frames when the teeth are raised, substantially as described.

In testimony whereof I affix my signature in presence of two witnesses.

HANNAH M. WHIPPLE,
*Administratrix of the estate of Effinger E. Whipple, deceased.*

Witnesses:
 META MAY ASHLEY,
 JOHN R. BABCOCK.